United States Patent [19]

Bjork

[11] 3,819,983
[45] June 25, 1974

[54] PHOTOFLASH POWER SUPPLY

[75] Inventor: Albion P. Bjork, Lincoln, Mass.

[73] Assignee: Polaroid Corporation, Cambridge, Mass.

[22] Filed: Sept. 8, 1970

[21] Appl. No.: 70,108

[52] U.S. Cl. ......... 315/238, 315/241 P, 315/241 R, 320/1, 323/22 T
[51] Int. Cl. ............................................. H05b 37/00
[58] Field of Search .... 315/238, 240, 241 P, 241 R; 320/1; 323/22 T

[56] References Cited
UNITED STATES PATENTS

| | | | |
|---|---|---|---|
| 2,935,650 | 5/1960 | Rock | 315/241 |
| 3,003,108 | 10/1961 | Thiele | 307/315 X |
| 3,031,608 | 4/1962 | Voneschen et al. | 323/22 |
| 3,218,542 | 11/1965 | Taylor | 323/22 |
| 3,399,338 | 8/1968 | Burgert et al. | 323/22 T |
| 3,505,583 | 4/1970 | Burkhardt et al. | 315/241 |
| 3,560,842 | 2/1971 | Caprari | 320/1 X |
| 3,586,906 | 6/1971 | Okuno et al. | 315/241 P |
| 3,594,627 | 7/1971 | Lesher | 320/1 X |

OTHER PUBLICATIONS

Pohl "Zener in Preregulator Limits Series Transistor Dissipation" Electronics Vol. 42., No. 22, Oct. 27, 1969 p. 98

Primary Examiner—Herman Karl Saalbach
Assistant Examiner—Lawrence J. Dahl

[57] ABSTRACT

In a photoflash power supply a capacitor is charged to a predetermined voltage from an unregulated voltage source. The capacitor is then discharged to energize a photoflash lamp. A transistor switch is connected between the unregulated voltage source and the capacitor. When the voltage across the capacitor reaches the predetermined value, the transistor switch is completely cut off.

8 Claims, 1 Drawing Figure

PATENTED JUN 25 1974

3,819,983

INVENTOR
ALBION P. BJORK

BY Brown + Mikulka
and Richard L. Aitken

ATTORNEYS

3,819,983

PHOTOFLASH POWER SUPPLY

BACKGROUND OF THE INVENTION

This invention relates to power supplies for photoflash lamps and more particularly to regulated photoflash lamp power supply systems in which the photoflash lamp is energized by discharging a capacitor.

In photoflash systems it is desirable for the electrical energy which energizes the flash lamp to be precisely regulated so that the amount of light illuminating the subject to be photographed is precisely controlled. One way of accomplishing this regulation is to charge a capacitor to a selected voltage and then energize the flash lamp by discharging the capacitor through the flash lamp. Photoflash systems of the prior art, which control the flash energization in this manner, require complex circuits and require significant amounts of electrical energy to maintain the regulated charge on the capacitor.

SUMMARY OF THE INVENTION

The system of the present invention regulates the value to which the capacitor supplying the photoflash is charged with a simple transistor circuit. When the capacitor has been charged to the desired value, the current to the capacitor is cut off and very little current is required to maintain the desired charge on the capacitor. Moreover, the value of the voltage to which the capacitor is charged can be varied to permit lightening or darkening the flash as desired. In accordance with the invention a transistor switch is inserted between the unregulated power supply and the capacitor. A voltage sensing circuit responds to the voltage across the capacitor and when this voltage reaches the desired value the voltage sensing circuit opens the transistor switch, thus preventing any additional current from charging the capacitor.

DESCRIPTION OF THE PREFERRED EMBODIMENTS

Figure 1:
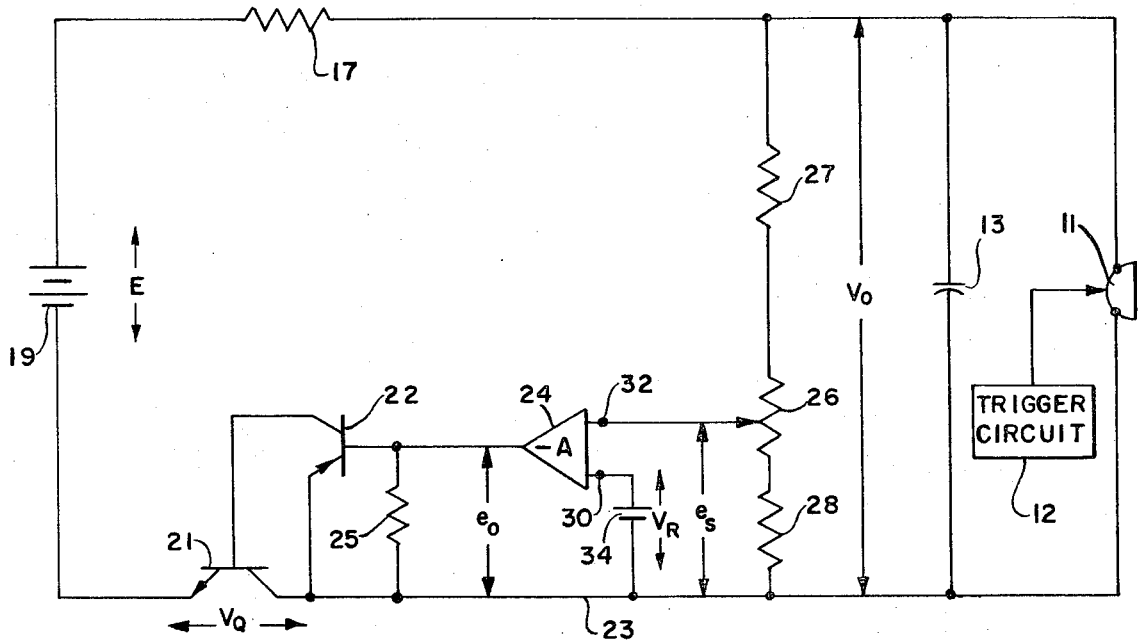
FIG. 1 is a circuit diagram illustrating the photoflash power supply system of the present invention.

As shown in the circuit diagram, a photoflash lamp 11 is connected in parallel with a capacitor 13. When the capacitor has been charged to the desired value, the photoflash lamp 11 may be rendered conductive by a trigger circuit 12 and the capacitor 13 will discharge through the flash lamp 11 energizing it. The flash lamp will then generate a light flash which corresponds in energy to the voltage to which the capacitor 13 is charged. One side of the capacitor 13 is connected through a 2-kilohm resistor 17 to the positive side of an unregulated power supply represented in the form of a battery 19, the voltage of which may vary from 342 volts to 442 volts. The negative side of the battery 19 is connected to the emitter of an NPN transistor 21, the collector of which is connected to the other side of the capacitor 13 through a conductor 23. The base of the transistor 21 is connected to the collector of a PNP transistor 22, the emitter of which is connected to the conductor 23 and the base of which is connected to the output of a differential amplifier 24. A resistor 25 connects the base of transistor 22 to the conductor 23.

A potentiometer 26 is connected between resistors 27 and 28 across the capacitor 13. One input terminal 32 of the amplifier 24 is connected to the movable tap of the potentiometer 26 and the other input terminal 30 of the amplifier is connected to the positive pole of a reference battery 34. The negative pole of the battery 34 is connected to the conductor 23.

When the capacitor 13 is discharged, the voltage across the capacitor 13 will be near zero so the voltage $e_s$ between the terminal 32 and the conductor 23 will be near zero volts. As a result the potential at the input terminal 32 of the amplifier 24 will be negative with respect to input terminal 30 by an amount equal to the voltage of the battery 34.

When the input terminal 32 is negative with respect to the terminal 30, the output voltage of the amplifier 24 across the resistor 25 will be negative. Accordingly, when the capacitor 13 is discharged, the negative output voltage of the amplifier 24 will render the transistor 22 conductive. The transistor 22 will supply current to the base of the transistor 21 and cause the transistor 21 to saturate so that a conductive circuit is completed between the negative pole of the battery 19 and the conductor 23. As a result the capacitor 13 will be charged through the resistor 17 and a positive voltage will begin to build up at the junction between the resistor 17 and the capacitor 13. Accordingly, the potential on the movable tap of the potentiometer 26 will rise, so that the voltage between the terminals 32 and 30 drops. As a result, the output voltage of the amplifier 24 will become less negative. When the voltage across the capacitor 13 reaches the desired value, for example, 340 volts, the potential at terminal 32 will have risen to the voltage $V_R$ of the battery 34 and the output of the amplifier 24 will have risen from a negative value to ground to cut off the transistor 22 which in turn will cut off the transistor 21, and no further current will flow to charge the capacitor 13.

When the transistors 21 and 22 are in transition from conducting to being cut off, the transistor 21 comes out of saturation and operates in the linear region. During this transition the voltage drop that existed across the resistor 17 when transistor 21 was saturated is transferred to be across transistor 21. While the transistor 21 operates in the linear region the gain of the transistors 21 and 22 is very high and, accordingly, the transistor 21 passes through the linear region very quickly. The turn-off of the transistor 21 is delayed slightly due to charge depletion, so the capacitor 13 is charged to a voltage to raise the potential at input terminal 32 to a point to completely turn the transistor 21 off. In this manner the capacitor is charged precisely to the desired value and the current flow from the source 19 is completely cut off. Each time the capacitor 13 is discharged through the flash lamp it is recharged again to the desired value as described above.

Figure 2:
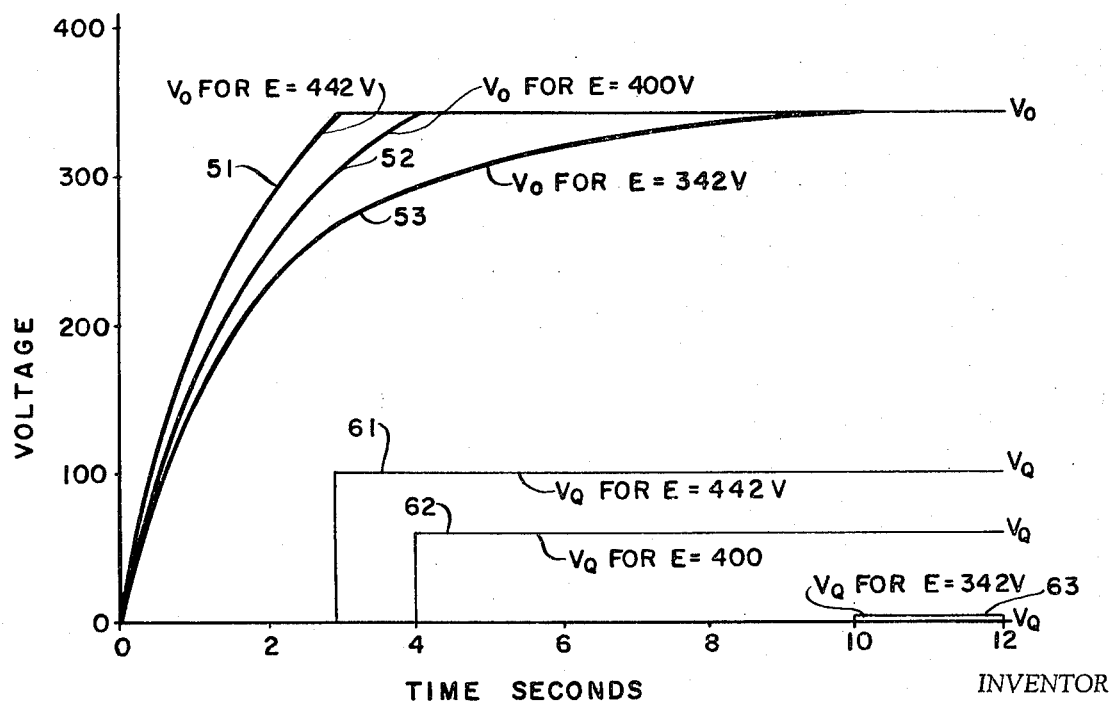
FIG. 2 is a graph plotting voltages against time for the circuit of FIG. 1.

The operation of the circuit is graphically illustrated in FIG. 2 for different values $E$ of the voltage source 19. As shown in this Figure, the curves 51, 52, and 53 plot the voltages $V_o$ across the capacitor 13 versus time as the capacitor 13 is charged from different supply voltages $E$ of 442 volts, 400 volts, and 342 volts, respectively, from the source 19. In each instance the capacitor 13 is charged to 340 volts. The curves 61, 62, and 63 plot the voltages $V_Q$ across the transistor 21 as the capacitor 13 is charged from the different supply voltages of 442, 400, and 342 volts from the source 19. As shown by these curves, the voltage $V_o$ rises in accordance with the RC time constant until it reaches 340 volts, whereupon the voltage rise abruptly stops. The voltage $V_Q$ across transistor 21 remains at substantially zero volts until the voltage $V_o$ reaches 340 volts, whereupon the voltage $V_Q$ sharply rises to the difference between the source voltage and 340 volts. The time that the voltage is abruptly rising is when the transistor 21 passes through the linear region.

The voltage to which the capacitor 13 is charged can be varied by moving the contact on the potentiometer 29. If the movable contact is moved up toward the junction between the resistor 17 and the capacitor 13, the voltage at input terminal 32 will be made more positive and thus the output of the amplifier 24 will reach the value at which the transistors 21 and 22 are cut off sooner, thus lowering the voltage to which the capacitor 13 is charged. Conversely, if the movable tap is moved in the opposite direction toward the conductor 23, the voltage to which the capacitor 13 is charged will be raised.

The resistance of the series circuit of the resistors 27 and 28 and the potentiometer 26 is selected to be large, so that very little current flows through this circuit and, accordingly, very little current is required to maintain the charge of the capacitor 13 at the desired value. When the leakage current that does flow causes the voltage across capacitor 13 to drop slightly to a value permitting the transistors 21 and 22 to be turned on again, the capacitor 13 will recharge to the selected output value, again causing the transistors 21 and 22 to cut off.

The above-described simple transistor circuit enables the electrical energy which is used to energize the flash lamp to be precisely regulated to a selected value without requiring a significant amount of energy to achieve the precise regulation.

The above description is of a preferred embodiment of the invention, and many modifications may be made thereto without departing from the spirit and scope of the invention which is defined in the appended claims.

I claim:

1. A photoflash power supply system comprising a photoflash lamp, a capacitor, means for selectively discharging said capacitor through said flash lamp, a source of unregulated voltage, and circuit means for charging said capacitor from said source of unregulated voltage to a predetermined value, said circuit means including an electronic valve connected in series with said capacitor across said source of unregulated voltage, and means responsive to the voltage across said capacitor permitting the voltage across said capacitor to charge through said electronic valve to said predetermined value and then cutting off said electronic valve when said voltage reaches said predetermined value.

2. A photoflash power supply system as recited in claim 1 wherein said electronic valve has a gate electrode, the conductivity of said electronic valve being controlled in accordance with a signal applied to said gate electrode, said means responsive to the voltage across said capacitor comprising an amplifier having a signal corresponding to the voltage across said capacitor applied to the input thereof and driving said gate electrode with the output thereof, said circuit means delaying the turning off of said electronic valve as the voltage across said capacitor approaches said predetermined value whereby said predetermined value to which said capacitor is charged causes said amplifier to drive said electronic valve completely to cut off.

3. A photoflash power supply system as recited in claim 2 wherein said electronic valve comprises a transistor, said amplifier driving said transistor to saturation when said voltage is below said predetermined value, the turning off of said transistor being delayed as the voltage across said capacitor approaches said predetermined value as the result of minority carrier depletion.

4. A photoflash power supply system as recited in claim 3 wherein said amplifier includes a second transistor of the opposite conductivity type from that of said first-mentioned transistor, said second transistor having its collector connected to the base of said first-mentioned transistor and having its emitter connected to the collector of said first-mentioned transistor.

5. A photoflash power supply system as recited in claim 1 wherein said circuit means further comprises a resistance connected in series with said capacitor and said electronic valve whereby the voltage drop across said resistance is transferred to be across said electronic valve when said electronic valve is cut off.

6. A photoflash power supply system as recited in claim 1 wherein said electronic valve comprises a transistor, wherein said means responsive to the voltage across said capacitor saturates said transistor when the voltage across said capacitor is below said predetermined value, the turning off of said transistor being delayed as the voltage across said capacitor approaches said predetermined value due to the minority carrier depletion whereby said predetermined value to which said capacitor is charged is sufficiently high to cause said means responsive to the voltage across said capacitor to drive said transistor completely to cut off.

7. A photoflash power supply system as recited in claims 6 wherein said means responsive to the voltage across said capacitor includes a second transistor of the opposite conductivity type from that of said first-mentioned transistor having its collector connected to the base of said first transistor and having its emitter connected to the collector of said first transistor.

8. A photoflash power supply system as recited in claim 6 wherein said circuit means includes a resistance connected in series with said capacitor and said transistor across said source of unregulated voltage, the voltage drop across said resistance being transferred to be across said transistor when said transistor is cut off.

* * * * *